US012348935B2

(12) United States Patent
Johansen et al.

(10) Patent No.: US 12,348,935 B2

(45) Date of Patent: Jul. 1, 2025

(54) EARPIECE FOR A HEARING DEVICE AND A METHOD OF DETACHABLE ASSEMBLY OF AN EARPIECE OF A HEARING DEVICE

(71) Applicant: GN Hearing A/S, Ballerup (DK)

(72) Inventors: Jan Johansen, Køge (DK); Timea Denisa Merca, Køge (DK)

(73) Assignee: GN Hearing A/S, Ballerup (DK)

( * ) Notice: Subject to any disclaimer, the term of this patent is extended or adjusted under 35 U.S.C. 154(b) by 235 days.

(21) Appl. No.: 18/107,309

(22) Filed: Feb. 8, 2023

(65) Prior Publication Data

US 2023/0403521 A1 Dec. 14, 2023

(30) Foreign Application Priority Data

Mar. 31, 2022 (DK) ........................... PA 2022 70149
Apr. 1, 2022 (EP) ..................................... 22166317

(51) Int. Cl.
*H04R 25/00* (2006.01)
*H04R 1/10* (2006.01)

(52) U.S. Cl.
CPC ......... *H04R 25/656* (2013.01); *H04R 1/1016* (2013.01); *H04R 25/554* (2013.01); *H04R 25/658* (2013.01)

(58) Field of Classification Search
CPC .. H04R 25/656; H04R 1/1016; H04R 25/554; H04R 25/658; H04R 2225/0216; H04R 25/60; H04R 25/652; H04R 1/1075; H04R 31/003; H04R 2231/001
See application file for complete search history.

(56) References Cited

U.S. PATENT DOCUMENTS

2008/0019554 A1 1/2008 Krywko
2009/0041261 A1 2/2009 Fickweiler et al.
2010/0139054 A1 6/2010 Gommel et al.

FOREIGN PATENT DOCUMENTS

CA 2209068 7/1996
CA 3140944 10/2020
RU 202992 U1 3/2021
RU 202993 U1 3/2021

OTHER PUBLICATIONS

1st Technical Examination for Danish Patent Application No. PA 2022 70149 dated Sep. 14, 2022.
English Machine Translation for Russian Patent Appln. No. RU 202992 U1.
English Machine Translation for Russian Patent Appln. No. RU 202993 U1.
Extended European Search Report for EP Patent Appln. No. 22166317.2 dated Oct. 5, 2022.

*Primary Examiner* — Tuan D Nguyen
(74) *Attorney, Agent, or Firm* — Vista IP Law Group, LLP

(57) ABSTRACT

Disclosed is an earpiece for a hearing device. The earpiece is configured for insertion into at least a part of an ear canal of a user's ear and comprises an earmold and a receiver module, wherein the receiver module is configured to be detachably introduced into an inner cavity of the earmold and comprises a receiver housing with an outer surface and a receiver, which receiver housing is configured for detachable mating with an adapter having an external and an internal surface. The disclosure further relates to a method of detachable assembly of an earpiece of a hearing device.

22 Claims, 7 Drawing Sheets

EARPIECE FOR A HEARING DEVICE AND A METHOD OF DETACHABLE ASSEMBLY OF AN EARPIECE OF A HEARING DEVICE

RELATED APPLICATION DATA

This application claims priority to, and the benefit of, Danish Patent Application No. 2022 70149 filed on Mar. 31, 2022, and European Patent Application No. 22166317.2 filed on Apr. 1, 2022. The entire disclosures of the above applications are expressly incorporated by reference herein.

FIELD

The present disclosure relates to hearing devices. More specifically, the disclosure relates to a hearing device and an earpiece for a hearing device and a method of detachable assembly of an earpiece of a hearing device. More specifically, the disclosure relates to an earpiece for a hearing device and a method of detachable assembly of an earpiece of a hearing device as defined in the introductory parts of claim 1 and claim 13.

BACKGROUND

A problem with the solutions of the prior art is that if parts of a hearing device intended for interconnection by being assembled together are made by 3D-printing, the tolerances after manufacture is variable risking that parts do not fit together at assembly or do not fit together sufficiently risking the parts easily coming loose after assembly or are very difficult or even impossible to fit together when trying to assemble the parts together.

A problem with the solutions of the prior art is that if parts of a hearing device intended for interconnection by being assembled together are fixedly connected by for example gluing or melting or welding, any disassemble is very difficult or even impossible without damaging or even breaking the parts when trying to disassemble or separate them from each other after assembly. Furthermore, adapters for earmold/receiver module solutions typically need to move and flex to grip and release the receiver and glue tends to compromise such mechanisms.

A problem with the solutions of the prior art using glue for interconnecting parts is that gluing parts together is labor demanding and that the accomplished result depends mainly on the skills of the operator performing the task as too much or too little glue may be applied and/or at/on unwanted places, such that the glue is unevenly spread or distributed.

Thus, there is a need for an improved hearing device.

SUMMARY

It is an object of the present disclosure to mitigate, alleviate or eliminate one or more of the above-identified deficiencies and disadvantages in the prior art and solve at least the above-mentioned problems.

Disclosed is an earpiece for a hearing device, such as an earpiece of an in the ear (ITE) unit of a Receiver-in-Ear (RIE) hearing device or Microphone-and-Receiver-in-Ear (MaRIE) hearing device, wherein the earpiece is configured for insertion into at least a part of an ear canal of a user's ear and comprises an earmold and a receiver module, wherein the receiver module is configured to be detachably introduced into an inner cavity of the earmold and comprises a receiver housing with an outer surface and a receiver, which receiver housing is configured for detachable mating and/or attachment with an adapter having an external and an internal surface to enable the detachable introduction, mating and/or attachment of the receiver module and the adapter with the inner cavity of the earmold, characterized in that when the receiver module with the adapter, e.g. a receiver module and adapter unit, is detachably assembled into/attached with the earmold the outer surface of the receiver housing and the internal and external surfaces of the adapter and the inner surface of the inner cavity of the earmold are physically configured such that a separation/disassemble of the earmold from the adapter and the receiver module, e.g. the receiver module and adapter unit, requires less force than a separation/disassemble of the receiver module and the adapter from each other.

It is an advantage that the earpiece is provided with a detachable adapter and receiver module enabling easy assembly and disassembly of both the adapter and the receiver module. It is an advantage that the earpiece is provided with an adapter and receiver module that are configured to be them between easily attachable as one unit and detachable from each other while also enabling easy assembly and disassembly of this assembled receiver module and adapter unit to/into and from/out of the earmold without the adapter and receiver module coming loose or be detached from each other when being removed from the earmold. It is an advantage that the adapter and receiver module are securely held together when assembled as one unit while enabling easy detachment of the adapter from the receiver module without being detached when the adapter and receiver module is removed from the earmold, i.e. the receiver module and adapter unit remain an intact assembled unit when removed from the earmold. It is an advantage to provide a receiver module with an adapter that is able to work as a belly or waist-band/-belt that after assembly onto the receiver module compensates for different and varying sizes/shapes and tolerances of the receiver housing when mounted thereon such that the receiver module and adapter unit fits snugly and securely into the earmold even though the tolerances of the receiver module and/or the earmold after manufacture may vary in great range. It is an advantage that this bellyband-like adapter supports the differences in shape within the production tolerances of the receiver housing(s) and/or the earmolds. It is an advantage that this bellyband-like adapter can move and flex to properly grip and release the receiver module. Advantageously, this new solution is less labor demanding, due to a simpler assembly process, and increases the probability of a correct assembly of the parts being interconnected.

According to an aspect, disclosed is a method of detachable assembly of an earpiece of a hearing device, such as an earpiece of an in the ear (ITE) unit of a Receiver-in-Ear (RIE) hearing device or Microphone-and-Receiver-in-Ear (MaRIE) hearing device, the earpiece being configured for insertion into at least a part of an ear canal of a user's ear and comprises an earmold and a receiver module, wherein the receiver module is configured to be detachably introduced into an inner cavity of the earmold and comprises a receiver housing with an outer surface and a receiver, characterized by detachably mating/attaching the receiver housing with an adapter, e.g. providing a receiver module and adapter unit, in a first step, e.g. a first assembly step, by detachably assembling/fitting the adapter over the outer surface of the receiver housing and in a second step, e.g. a second assembly step, detachably introducing the receiver module with the adapter, e.g. the receiver module and adapter unit, into the inner cavity of the earmold.

It is an advantage that the adapter and the receiver module are assembled as one unit firstly as then, secondly, the introduction of this adapter and receiver module into the earmold is easily done, e.g. due to the fact that only two entities are to be handled after the first assembly. It is an advantage that the adapter and the receiver module are assembled as one unitary part firstly as then the two entities are pre-assembled and may be stored and easily moved around and transported with less risk of losing any of these entities, i.e. the adapter or the receiver module or both, by mistake.

In an embodiment, a hearing device is configured to be worn by a user. The hearing device may be arranged at the user's ear, on the user's ear, over the user's ear, in the user's ear, in the user's ear canal, behind the user's ear and/or in the user's concha, i.e. the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a hearing aid, an over-the-counter (OTC) hearing device, a hearing protection device, a custom hearing device or another head-wearable hearing device. Hearing devices can include both prescription devices and non-prescription devices.

The hearing device may be embodied in various housing styles or form factors. Some of these form factors are Receiver-in-Canal (RIC) hearing device, also known as Receiver-in-Ear (RIE) hearing device, or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The terms RIE, RIC and MaRIE hearing devices refer to hearing devices where the receiver may be comprised in the ITE unit, which is coupled to the BTE unit via a connector cable or electrical wire/tube configured for transferring electric signals between the BTE and ITE units.

Some of these form factors are earbuds. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g. as part of a binaural hearing system and/or from one or more accessory device(s), such as a smartphone and/or a smart watch.

In an embodiment, the hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit (IC), an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing device may comprise a digital-to-analogue converter configured to convert the first electric output signal, the second electric output signal and/or the wireless output signal into an analogue signal.

In an embodiment, the hearing device may comprise a vent. A vent is a physical passageway such as a canal or tube primarily placed to offer pressure equalization across a housing placed in the ear such as an ITE unit of a RIE hearing device, a RIC hearing device or a MaRIE hearing device, or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

In an embodiment, the ITE unit typically comprises the earpiece such as a housing, a plug connector, and an electrical wire/tube connecting the plug connector and earpiece. The earpiece may comprise an in-the-ear housing or receiver housing, a receiver, such as a receiver configured for being provided in an ear of a user, and an open or closed dome or earmold. The earmold may support correct placement of the earpiece in the ear of the user. The ITE unit may comprise an input transducer e.g. a microphone or a receiver, an output transducer e.g. an speaker, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the ITE unit and electronic components provided in the BTE unit. The electrical wire/tube as well as the ITE unit itself may have different lengths.

In some embodiments, when the receiver module with the adapter, e.g. the receiver module and adapter unit, is detachably assembled into/attached with the earmold, the friction between the outer surface of the receiver housing and the internal surface of the adapter is higher than the friction between the inner surface of the inner cavity of the earmold and the external surface of the adapter.

It is thus an advantage that the receiver module and adapter unit may be removed from the earmold as one part.

In some embodiments, the outer surface of the receiver housing comprises one or more aligning/guiding structures providing an indication of the adapter being properly/correctly positioned on the receiver module. The one or more aligning/guiding structures may thus enable the adapter to be properly/correctly positioned on the receiver module.

It is an additional advantage that the user or operator doing the assembly receives a feedback, such as haptic and/or visual feedback, indicating that correct placement/positioning of the adapter on the receiver module has been achieved.

It is a further advantage that no post-adjustments or other fixating arrangements than just the adapter is needed for the assembly of the adapter on the receiver module.

In some embodiments, when the receiver module with the adapter, e.g. the receiver module and adapter unit, is detachably assembled into the earmold (detachably attached with the earmold), the force required to pull the adapter past/over the one or more aligning/guiding structures on the outer surface of the receiver housing is higher than the force required to overcome the friction between the inner surface of the inner cavity of the earmold and the external surface of the adapter.

It is thus an advantage that the receiver module an adapter unit may be removed from the earmold as one part.

In some embodiments, the adapter is configured to form a securing/holding and/or sealing part between the receiver module and the earmold when the receiver module with the adapter, e.g. the receiver module and adapter unit, is detachably assembled into the earmold, i.e. the receiver module and adapter unit is detachably attached with the earmold.

It is an additional advantage that leakage of sound and/or dirt between the receiver module and earmold is hindered when the receiver module and adapter unit is detachably assembled into the earmold.

An advantage is also that any uneven gluing creating a leakage of sound is avoided.

In some embodiments, the external surface of the adapter comprises one or more protrusions configured to form the securing/holding and/or sealing part between the receiver module and the earmold when the receiver module with the adapter, e.g. the receiver module and adapter unit, is detachably assembled/attached with into the earmold.

It is thus an advantage that leakage of sound and/or dirt between the receiver module and earmold is hindered when the receiver module and adapter unit is detachably assembled into/attached with the earmold.

In some embodiments, one or two or three or more or all of the protrusions of the adapter is/are configured to be adaptable and/or compressible and/or shapeable and/or shape-changeable and/or formable and/or deformable.

It is an additional advantage that an adaption of the one or more protrusions provide a surface portion of each protrusion being shaped after the inner surface of the inner cavity of the earmold when the receiver module and adapter unit is detachably assembled into/attached with the earmold. The one or more protrusions may hereby be at least partly flattened providing a larger and/or closer/tighter contact or engagement surface/area between the inner surface of the inner cavity of the earmold and the external surface on the adapter. In case the inner surface of the inner cavity of the earmold is provided with one or more groove(s)/indent(s), the surface portion of the one or more protrusions may be fully or partly shaped after the form of the one or more groove(s)/indent(s). In any case an improved securing/holding and/or sealing functionality between the receiver module and adapter unit and the earmold may be provided. Moreover, also an improved feedback, such as haptic feedback, to the user or operator doing the assembly indicating that correct placement/positioning of the receiver module and adapter unit into the earmold is achieved.

In some embodiments, the one or more aligning/guiding structures of the outer surface of the receiver housing is/are configured to secure the adapter in position when the adapter is assembled on the receiver module and/or receiver housing, such as on the receiver housing of the receiver module.

It is thus an advantage that the receiver module and adapter unit may be detachably assembled into/attached with the earmold as one part.

In some embodiments, the one or more aligning/guiding structures of the outer surface of the receiver housing is/are two or more protrusions between which the adapter is secured in position when the adapter is detachably assembled on/onto the receiver module and/or receiver housing, such as on the receiver housing of the receiver module.

In some embodiments, the one or more aligning/guiding structures of the outer surface of the receiver housing is one or more groove(s) (or indent(s)) in which the adapter is introduced and secured in position when the adapter is assembled on/to the receiver module and/or receiver housing, such as on the receiver housing of the receiver module.

In some embodiments, the one or more aligning structures of the outer surface of the receiver housing is a band or area having a textured and/or coated surface on/over/at which the adapter is introduced and secured in position when the adapter is assembled on/to/onto/over the receiver housing.

It is an additional advantage that one or more of the aligning structures as described above, i.e. protrusion(s), groove(s), indent(s), band(s) or area(s) having a textured and/or coated surface, provide(s) an improved securing of the adapter in position when the adapter is assembled on the receiver module.

In some embodiments, the outer surface of the receiver housing and the internal surface of the adapter are physically configured such that the force required to separate/disassemble the adapter from the receiver module is above/about 3 N or between about 3 N to 8 N or between 3 N to 8 N or between about 3 N to 5 N or between 3 N to 5 N.

It is an additional advantage that a force about or above 3 N provide a proper fit and/or retention between the adapter and the receiver module and/or that a force about or below 5 N and/or 8 N allows a user or operator to separate/disassemble the adapter and the receiver module from each other by hand or the use of a simple tool without demanding a too great effort while not risking that the adapter and receiver module come loose from each other accidentally, i.e. too easily, e.g. without sufficient resistance.

In some embodiments, when the receiver module with the adapter, e.g. the receiver module and adapter unit, is detachably assembled into/attached with the earmold, the external surface of the adapter and the inner surface of the inner cavity of the earmold are physically configured such that the force required to separate/disassemble the adapter and the receiver module, i.e. the receiver module and adapter unit, from the earmold is above/about 3 N or between about 3 N to 12 N or between 3 N to 12 N.

It is an additional advantage that a force about or above 3 N provide a proper fit and/or retention between the receiver module and adapter unit when inserted in the earmold and/or that a force about or below 12 N allows a user or operator to separate/disassemble the receiver module and adapter unit and the earmold from each other by hand or the use of a simple tool without risking to separate/disassemble the adapter from the receiver module or vice versa instead or at the same time.

In some embodiments, when the receiver module with the adapter, e.g. the receiver module and adapter unit, is detachably assembled into the earmold, the outer surface of the receiver housing and the internal surface of the adapter are physically configured such that the force required to separate/disassemble the adapter from the receiver module is at least 1 N more than the force required to separate/disassemble the receiver module with the adapter, e.g. the receiver module and adapter unit, from the earmold.

It is thus an advantage that the receiver module and adapter unit may be removed from the earmold as one part without risking to separate/disassemble the adapter from the receiver module or vice versa instead or at the same time.

In some embodiments, the force required to separate/disassemble the adapter from the receiver module is increased when the receiver module and adapter unit is detachably assembled into the earmold compared to the force required to separate/disassemble the adapter from the receiver module when the receiver module and adapter unit is not being detachably assembled into the earmold. This, as the internal surface of the adapter is pressed towards the outer surface of the receiver housing by the earmold when the receiver module and adapter unit is detachably assembled into the earmold.

It is an advantage that an improved and/or tight fitting, and an improved securing/holding of the adapter on the receiver module, and/or an improved sealing to hinder leakage of sound and/or dirt between the receiver module and the earmold are provided.

In some embodiments, the inner surface of the inner cavity of the earmold comprises one or more groove(s)/indent(s) configured/adapted to receive the one or more protrusions on the external surface of the adapter.

It is an additional advantage that the user or operator doing the assembly receives a feedback, such as haptic feedback, indicating that correct placement/positioning of the receiver module and adapter unit into the earmold has been achieved.

It is a further advantage that no post-adjustments or other fixating arrangements than just the adapter is needed for the assembly of the receiver module and adapter unit into the earmold.

In some embodiments, the earmold is a custom mould.

In some embodiments, the first step, i.e. a first assembly step, further concerns properly/correctly positioning the adapter on the receiver module. The first step comprising assembly of the receiver module and adapter unit, i.e. detachably mounting the adapter on the outer surface of the receiver module.

It is an advantage that the receiver module and the adapter may be detachably interconnected to form one part.

In some embodiments, the second step, i.e. a second assembly step, further concerns properly/correctly positioning the receiver module with adapter, e.g. the receiver module and adapter unit, inside the inner cavity of the earmold. The second step comprising assembly of the complete earpiece, i.e. detachably mounting the receiver module and adapter unit in the earmold.

It is an advantage that the receiver module and adapter unit may be detachably interconnected with the earmold to form an earpiece, such as an earpiece of an in the ear (ITE) unit of a Receiver-in-Ear (RIE) hearing device or Microphone-and-Receiver-in-Ear (MaRIE) hearing device, in a more controllable and easier way.

In some embodiments may the first step and/or the second step be configured to be as easy as possible for the operator or user, i.e. configured to be done with as little force and/or effort as possible.

In some embodiments, the method comprises a third step of disassembling the earpiece by detaching the receiver module with the adapter, e.g. the receiver module and adapter unit, from the earmold.

In some embodiments, the method comprises a fourth step of disassembling the receiver module and the adapter from each other.

It is an advantage that a first receiver module and adapter unit being detachably assembled into the earmold is replaceable by a second receiver module and adapter unit when needed, e.g. when wanting to change the first receiver module being damaged or older into another receiver module being upgraded or functioning.

It is an advantage that a first earmold being detachably assembled with the receiver module and adapter unit is replaceable by a second earmold when needed, e.g. when wanting to change the first earmold being damaged or older or not provide a correct fit of the earpiece in the users ear canal into another new or differently sized or differently shaped earmold.

It is an advantage that a first adapter being detachably assembled between the receiver module and the earmold is replaceable by a second adapter when needed, e.g. when wanting to change the first adapter being damaged or older or do not provide the preferred sealing and/or holding between the receiver module and earmold into another new adapter.

In some embodiments, wherein the earpiece is an earpiece according to any of the embodiments.

It is an advantage that the earpiece comprises detachable and replaceable parts or components providing easy recycling or upgrading or the like.

The present disclosure relates to different aspects including the hearing device, the earpiece and the system and method described above and in the following, and corresponding device parts and method steps, each yielding one or more of the benefits and advantages described in connection with the first mentioned aspect, and each having one or more embodiments corresponding to the embodiments described in connection with the first mentioned aspect and/or disclosed in the appended claims.

Throughout the present disclosure the terms "first", "second", "third", "fourth", etc. are used here and elsewhere for labelling purposes only and are not intended to denote any specific spatial or temporal ordering, but are included to identify individual elements. Throughout the present disclosure the terms "first", "second", "third", "fourth", etc. does not necessarily indicate any timing and/or prioritizing of the respective events or steps. Accordingly, one event, such as a first event, may occur before, during, or after another event, such as a second event, or the one event may occur at any combination of before, during, and after the other event.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
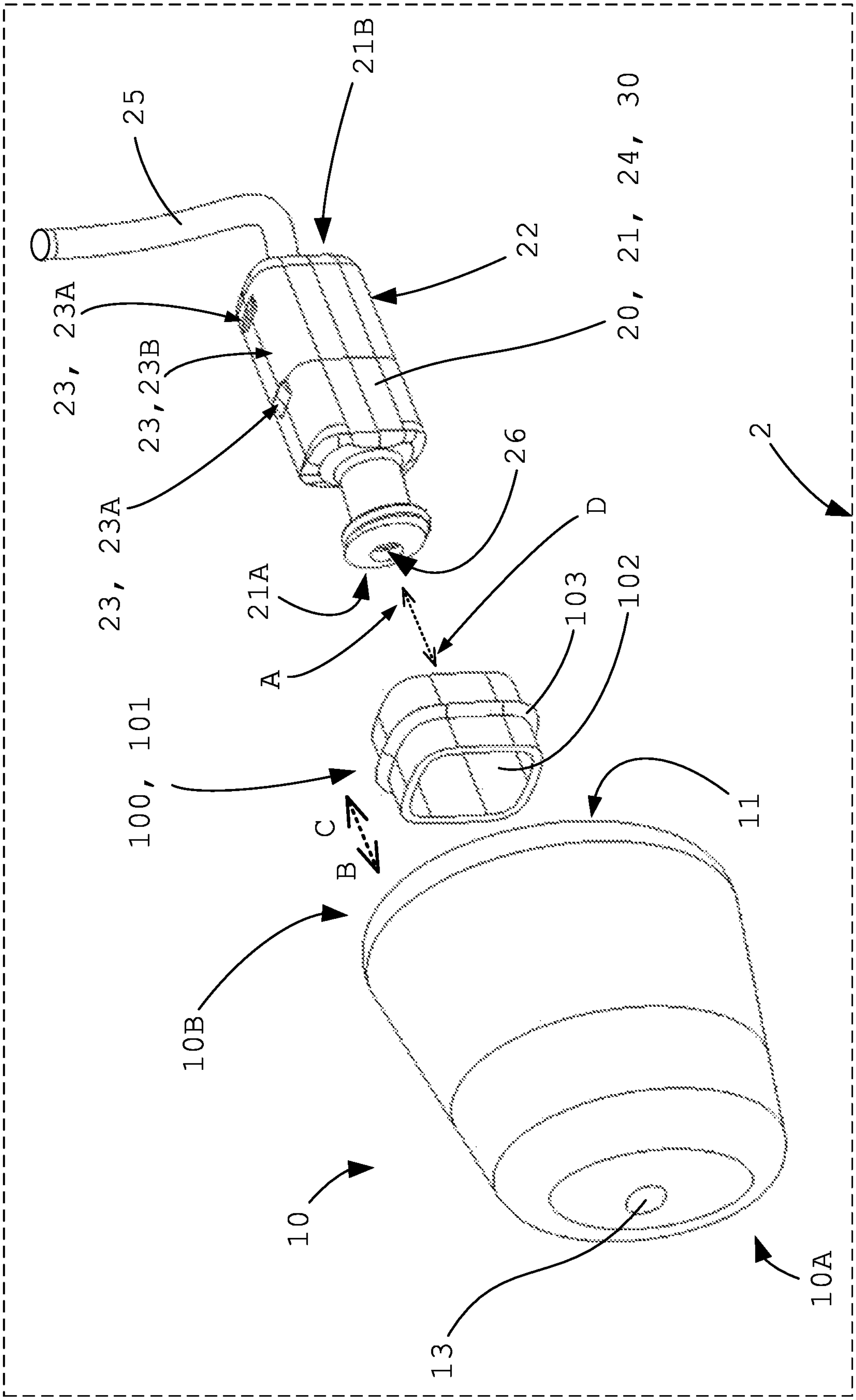
FIG. 1A schematically illustrates in a perspective view an exemplary earpiece and parts making it up before the parts are assembled together as the earpiece or during assembly of the parts for making up the earpiece or after disassembly of the earpiece and its parts.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1B:
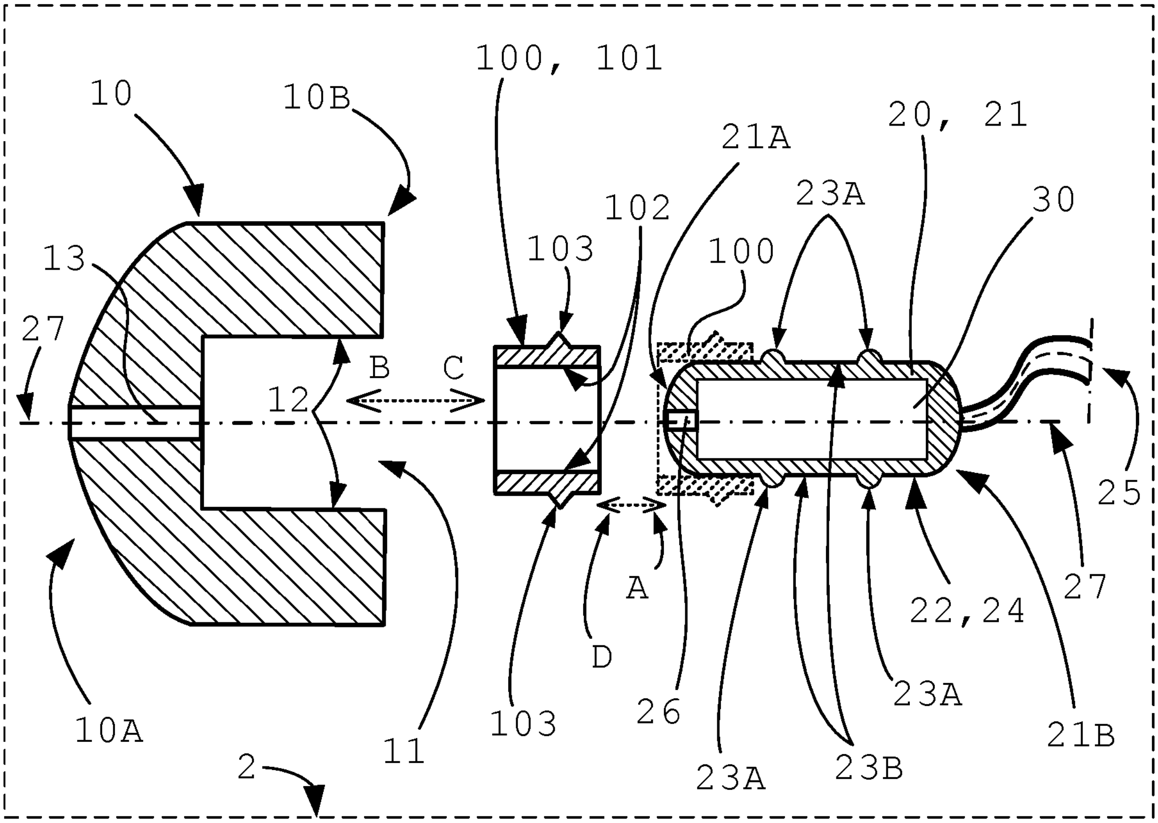
FIG. 1B schematically illustrates in a sectional view an exemplary earpiece and parts making it up before the parts are assembled together as the earpiece or during assembly of the parts for making up the earpiece or after disassembly of the earpiece and its parts.
Figure 3A:
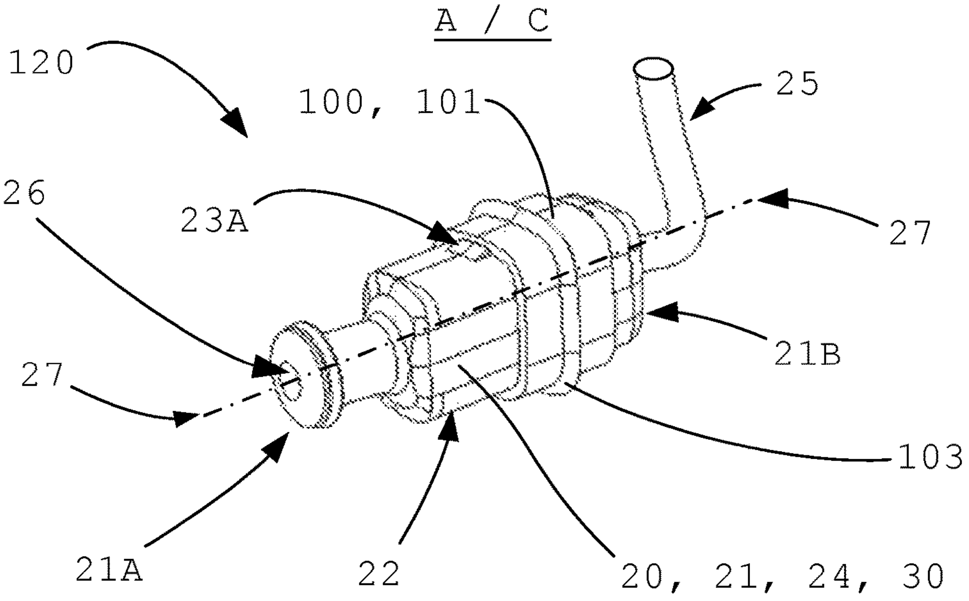
FIG. 3A schematically illustrates in a perspective view an exemplary part for an earpiece, which part is an unit comprising a receiver module and an adapter assembled together, before this part or receiver module and adapter unit is assembled to an earmold for making up the earpiece or during assembly of the receiver module and adapter unit to the earmold for making up the earpiece or after disassembly of the receiver module and adapter unit from the earmold.
Figure 3B:
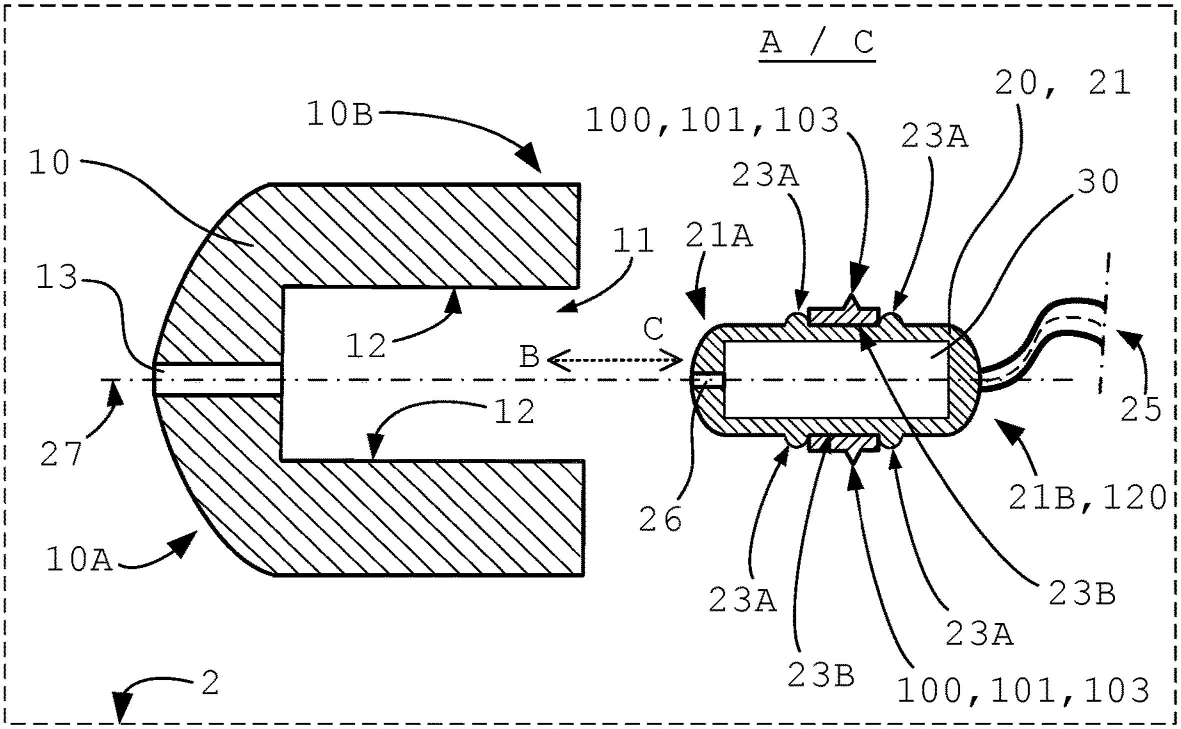
FIG. 3B schematically illustrates in a sectional view exemplary parts for an earpiece, the part shown to the right being an unit comprising a receiver module and an adapter assembled together and the part to the left being an earmold, before these parts, i.e. before the receiver module and adapter unit and the earmold are assembled together for making up the earpiece or illustrates these parts, i.e. the receiver module and adapter unit and the earmold during assembly for making up the earpiece or illustrates these parts, i.e. the receiver module and adapter unit and the earmold after disassembly of the earpiece by detachment of these parts, i.e. after detaching or removing the receiver module and adapter unit and the earmold from each other.
Figure 3C:
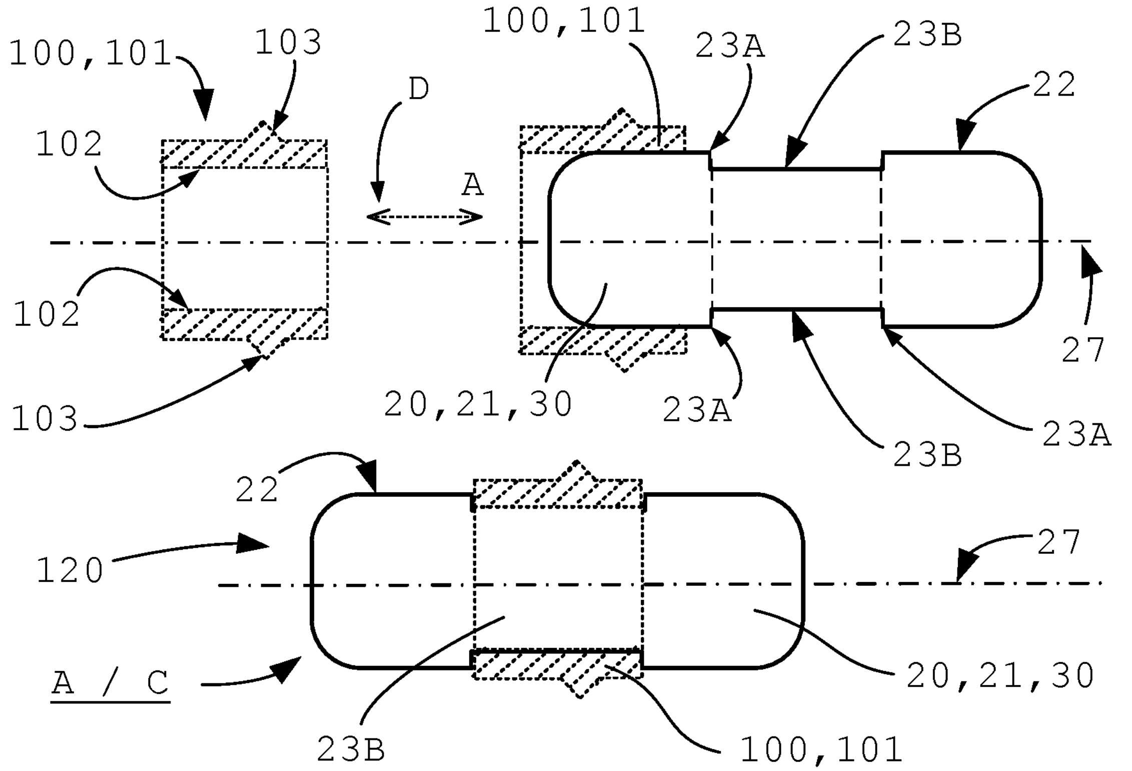
FIGS. 3C-3E schematically illustrates in plane side views exemplary versions of a unit comprising a receiver module shown in solid lines and an adapter shown in broken lines. In the upper view of each of FIGS. 3C-3E, the receiver module and the adapter are schematically shown before being assembled (the adapter being furthest to the left) and during assembly (the adapter being slipped on the receiver module in the middle of the upper view) together as one receiver module and adapter unit and before being assembled to an earmold for making up the earpiece or after disassembly of the unitary receiver module and adapter unit. The unitary receiver module and adapter unit is shown in the lower view of each of FIGS. 3C-3E illustrating the receiver module and the adapter after being assembled together as the one and unitary receiver module and adapter unit.
Figure 3D:
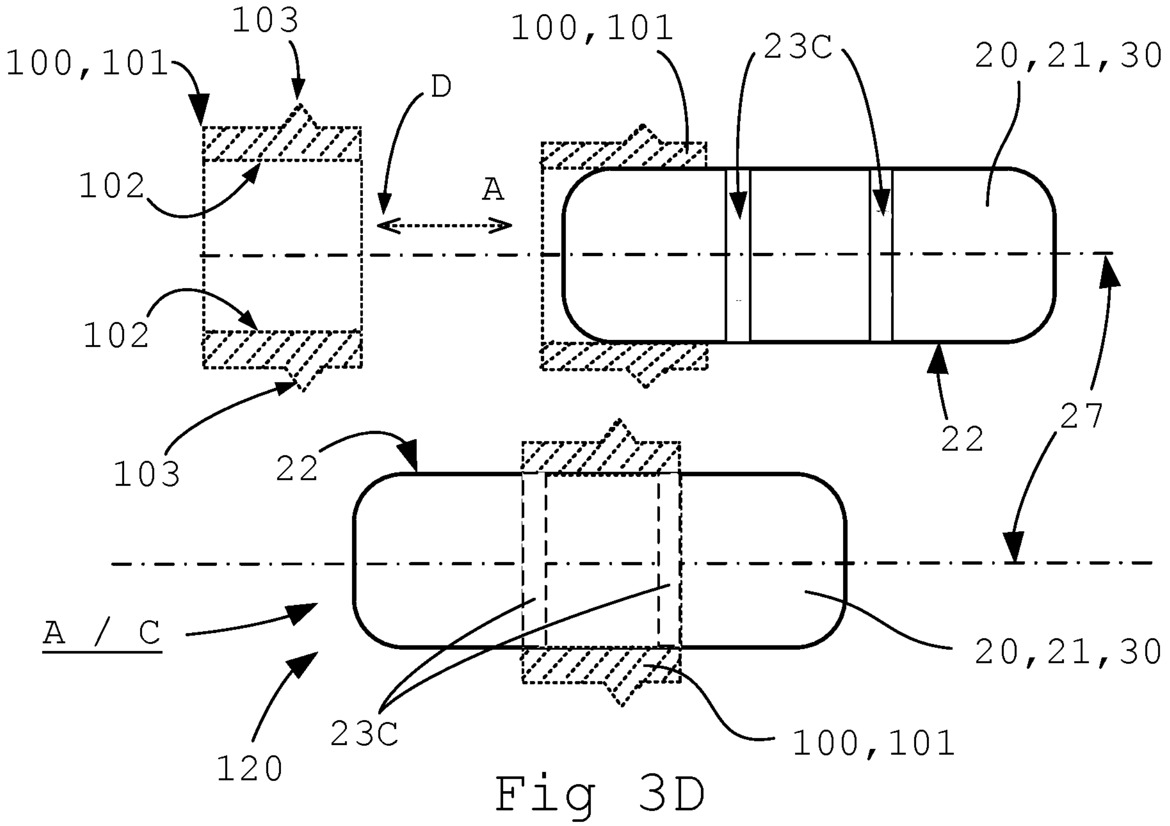

FIGS. 1A, 1B and 3B schematically illustrate one or more exemplary earpieces 2 for hearing devices 1 before assembly of the parts making up the earpiece or after disassembly of the parts making up the earpiece. The earpiece 2 comprises an earmold 10 (seen furthest to the left in FIGS. 1A, 1B), a receiver module 20 (seen furthest to the right in FIGS. 1A, 1B and an adapter 100 (the part shown between the earmold 10 and the receiver module in FIGS. 1A, 1B). The earmold 10, the receiver module 20 and the adapter 100 are configured to be detachably assembled together as the earpiece 2.

Figure 4:
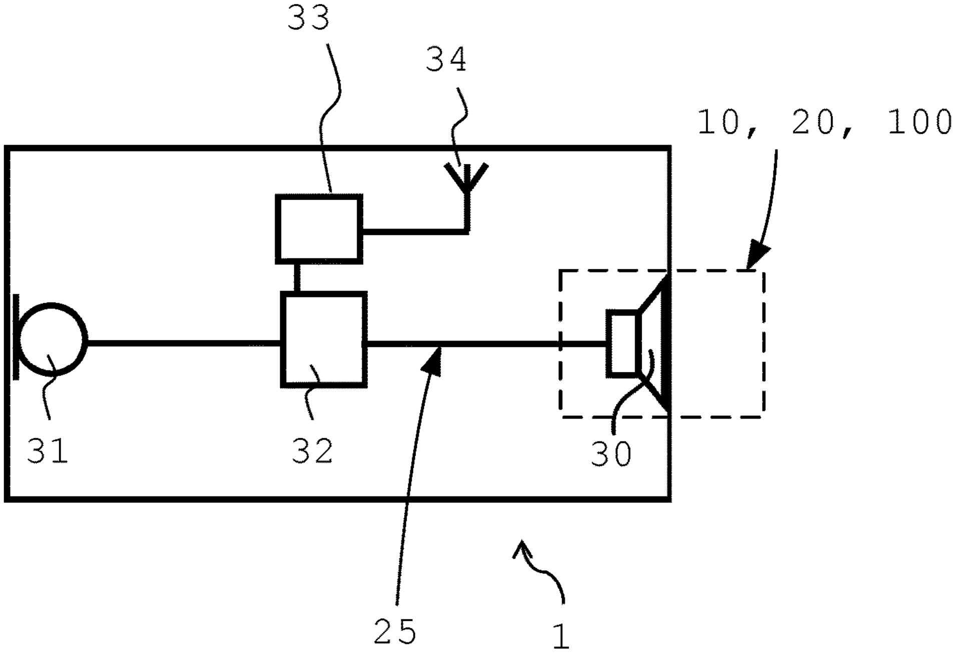
FIG. 4 schematically illustrates an example of a hearing device 1, such as a hearing aid.

An exemplary hearing device 1, such as a hearing aid, is shown in FIG. 4. The earpiece 2 is configured to be used in any appropriately designed hearing device 1, however, the preferred hearing device 1 to apply the earpiece is of course an in-ear type of hearing device, such as Receiver-in-Canal (RIC) hearing device, Receiver-in-Ear (RIE) hearing device and Microphone-and-Receiver-in-Ear (MaRIE) hearing device.

Figure 2A:
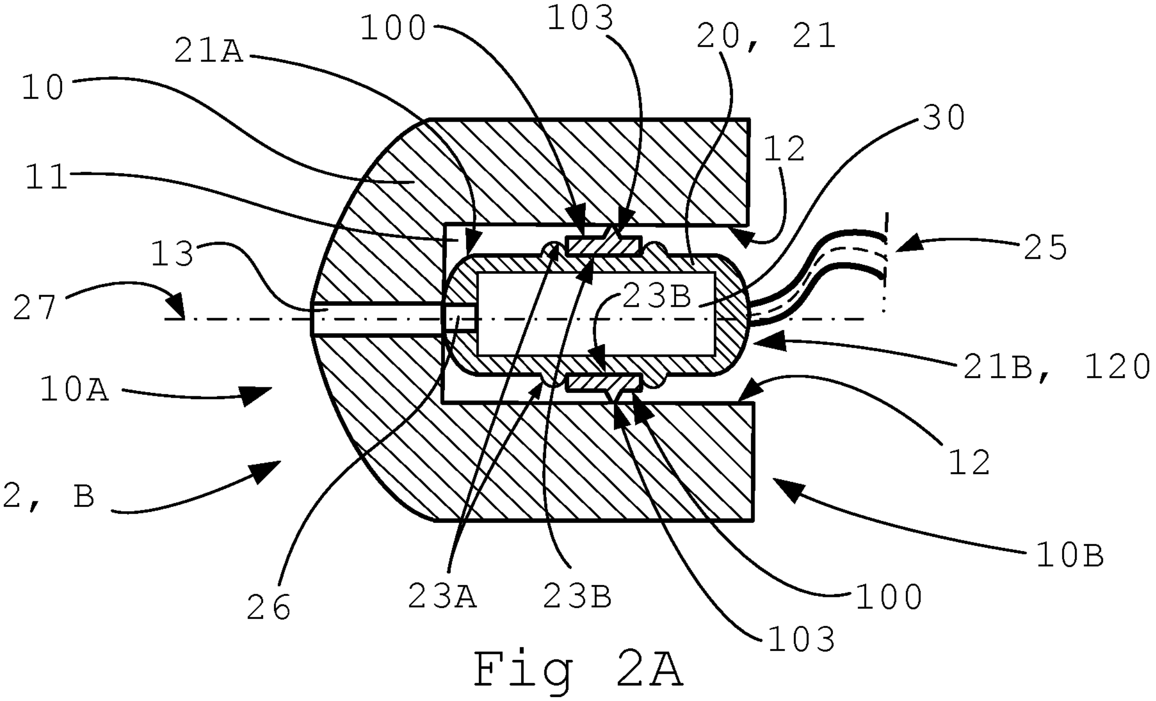
FIG. 2A schematically illustrates, in a sectional view and one orientation, an exemplary earpiece and parts making it up after the parts are assembled together as the earpiece or before the earpiece and its parts are disassembled.
Figure 2B:
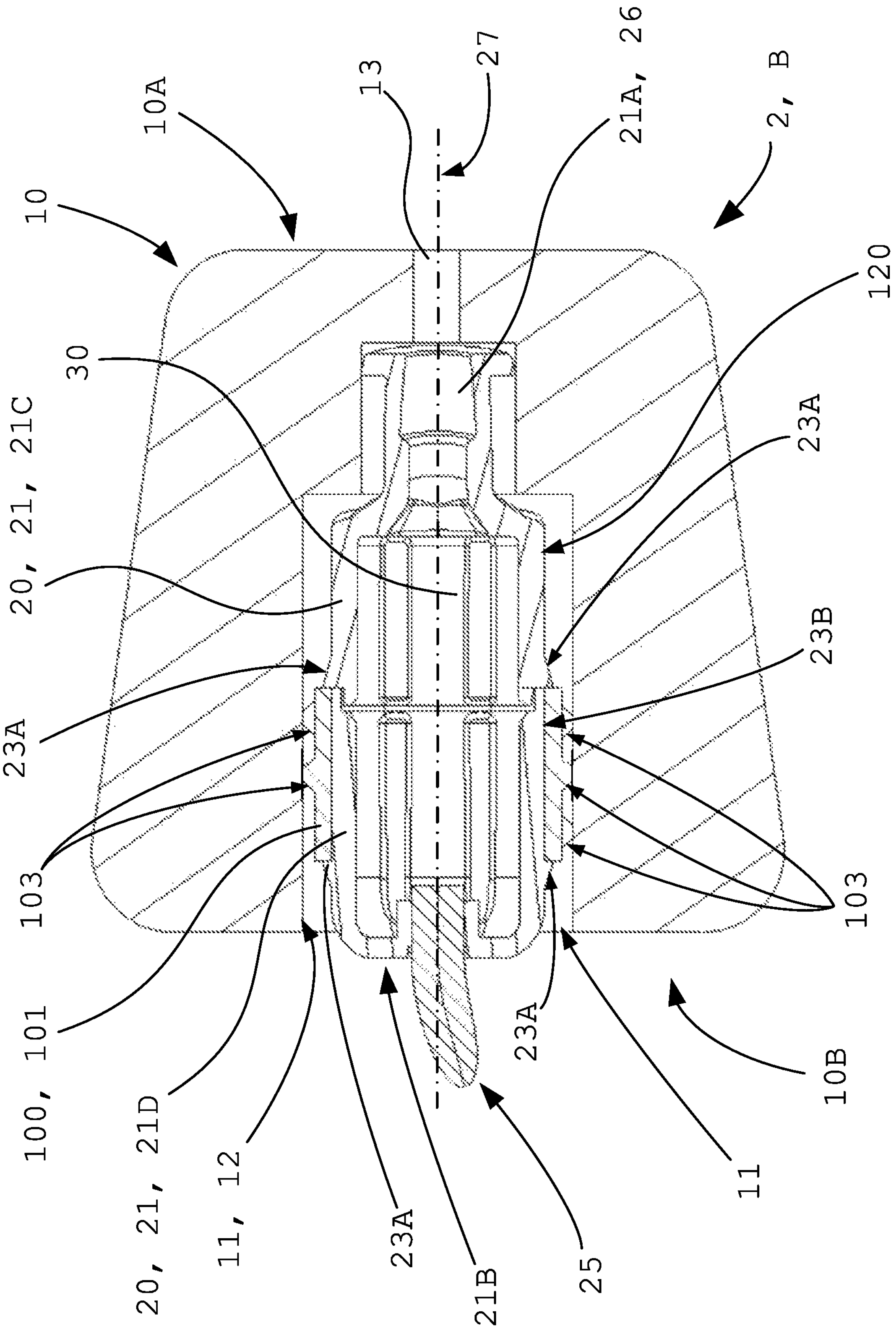
FIG. 2B schematically illustrates, in a sectional view and another orientation compared to FIG. 2A, an exemplary earpiece and parts making it up after the parts are assembled together as the earpiece or before the earpiece and its parts are disassembled.
Figure 2C:
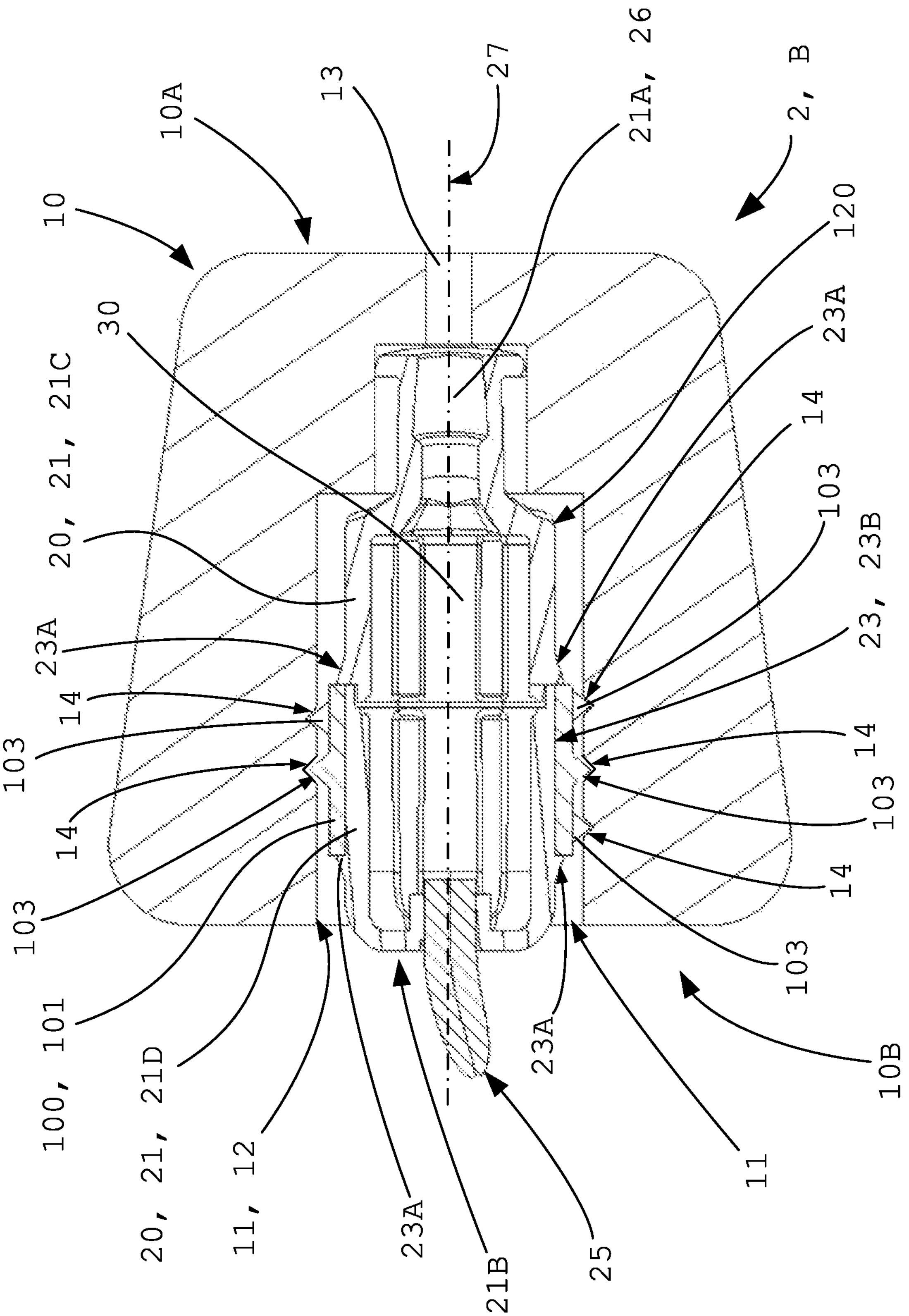
FIG. 2C schematically illustrates, in a sectional view and same orientation as in FIG. 2B, an exemplary earpiece and parts making it up after the parts are assembled together as the earpiece or before the earpiece and its parts are disassembled.

The earpiece 2 is shown in FIGS. 2A, 2B and 2C as one or more exemplary earpieces after assembly of the parts 10, 20, 100 making up the earpiece or before disassembly of the parts making up the earpiece. In FIG. 2A, the earmold 10 is directed to the left while in FIGS. 2B and 2C the earmold 10 is directed to the right. The earpiece 2 is configured for insertion into at least a part of an ear canal of a user's ear, but this is not shown, however, a skilled person is familiar with such earpieces, wherefore this function is not elaborated on in detail. The earmold 10 is dome-shaped to fit into the ear canal of a user's ear and may have a smooth outer surface. The dome-shape may provide a curved outer surface with no sharp or jagged projections. In an embodiment, the earmold 10 is a so-called custom earmold. A custom earmold 10, being shaped after a user's ear canal, may be partly asymmetrical and partly symmetrical. In an embodiment, the earmold 10 is a so-called standard earmold provided in predefined shape(s) and/or size(s). In an embodiment, the earmold 10 is shaped at least partly with a rotational symmetry, e.g. at least partly conical. In an embodiment, the earmold 10 may be made of a hard material, such as a hard polymer or metal, or a soft material, such as a rubber like polymer, and/or molded to have an outer shape conforming to the shape of the specific user's ear canal.

The earmold 10 comprises a first or front end 10A being rounded/smoothened to not have any sharp edges or corners or the like that may damage the ear canal. The earmold comprises a second or rear end 10B. The first end 10A is placed closer to the eardrum of the user than the second end 10B when the earpiece 2 is worn by the user. The first end 10A and the second end 10B could be arranged opposite each other as shown in the FIGS. 1A-2C and 3B but this orientation depends on the shape of the earmold 10, i.e. if the earmold is customized, its ends 10A, 10B could be arranged differently for each individual earmold as no ear canal has exactly the same shape/size as other ear canals. The second or rear end 10B of the earmold 10 comprises an opening into an inner cavity 11 of the earmold configured to detachably but securely receive the receiver module 20 with the adapter 100, this is shown in FIGS. 1B, 2A-2C and 3B.

The receiver module 20 (exemplary shown in all figures except for FIG. 4) comprises a receiver housing 21 with an outer surface 22 and a receiver 30. The receiver module 20 has a first end 21A and a second end 21B (FIGS. 1A, 1B, 2A, 3A and 3B show the first end 21A facing to the left and the second end 21B to right and FIGS. 2B and 2C show the first end 21A facing to the right and the second end 21B to the left). The receiver 30 is placed inside the receiver module 20 as seen in cross-sections of FIGS. 1B, 2A-2C and 3B. The receiver 30 is operatively connected to an electrical wire/tube 25, such as one or more tubes and/or wires and/or connector cables 25, shown in FIGS. 1A to 3B. In FIGS. 1B, 2A and 3B, the electrical wire is shown in broken lines extending inside a tube. In FIGS. 2B and 2C, the electrical wire is shown in solid lines extending inside a tube shown in cross-section. The operation of the receiver 30 configured for use in a hearing device 1 is well-known for a skilled person and not explained in more detail here as that is done in the Summary-section. The receiver module 20 is configured to be detachably introduced into the inner cavity 11 of the earmold 10 (see FIGS. 1B, 2A-C and 3B). The inner cavity 11 has an inner surface 12. The inner cavity 11 is in fluid communication with a through channel 13 of the earmold 10 at its first end 10A.

The receiver module 20 in FIGS. 1A, 2B, 2C and 3A has its first end 21A partly made into a cylindrical hollow tube ending at a free end. The receiver housing 21 may hereby be provided with a sound channel 26 at the first end 21A. An inner compartment of the receiver housing 21 may hereby be divided into two sections; a receiver receiving section and a sound channel section, where the sound channel section extends from the receiver receiving section. The receiver receiving section may be shaped after the size and shape of the receiver 30. In case of a rectangular shaped receiver 30, the receiver receiving section may be rectangular. The receiver receiving section and the sound channel section may each have a longitudinal center axis. The receiver receiving section and the sound channel section may have the same longitudinal center axis 27, wherein the longitudinal center axis 27 extends between the first end 21A and the second end 21B of the receiver module 20. The longitudinal center axis 27 may also be coincident with a center axis of the earmold 10 and/or the through channel 13 of the earmold 10 and/or the electrical wire/tube 25 (e.g. at or near the connection point between the receiver module and the electrical wire/tube) and/or the receiver 30 and/or the sound channel 26 of the receiver housing 21. In an embodiment, the free end of the cylindrical hollow tube may have a circumferential flange. The first end 21A is provided with one or more openings leading into the one or more sound channels 26 of the receiver module 20 for transmitting sound to and from one or more receivers 30 inside the receiver module 20, this first end 21A being shown as the part of the receiver module furthest to the left on the receiver module in FIGS. 1A and 3A. The other/second end 21B of the receiver module 20 is arranged opposite the first end 21A. The other/second end 21B of the receiver module 20 is configured to receive or to connect to the electrical wire/tube 25.

As shown in FIGS. 2B and 2C, the receiver housing 21 may comprise two parts, a front part 21C and a rear part 21D, which is configured for assembly around the receiver 30. The front part 21C and the rear part 21D may be glued or laser welded or snap fitted together.

Figure 3E:
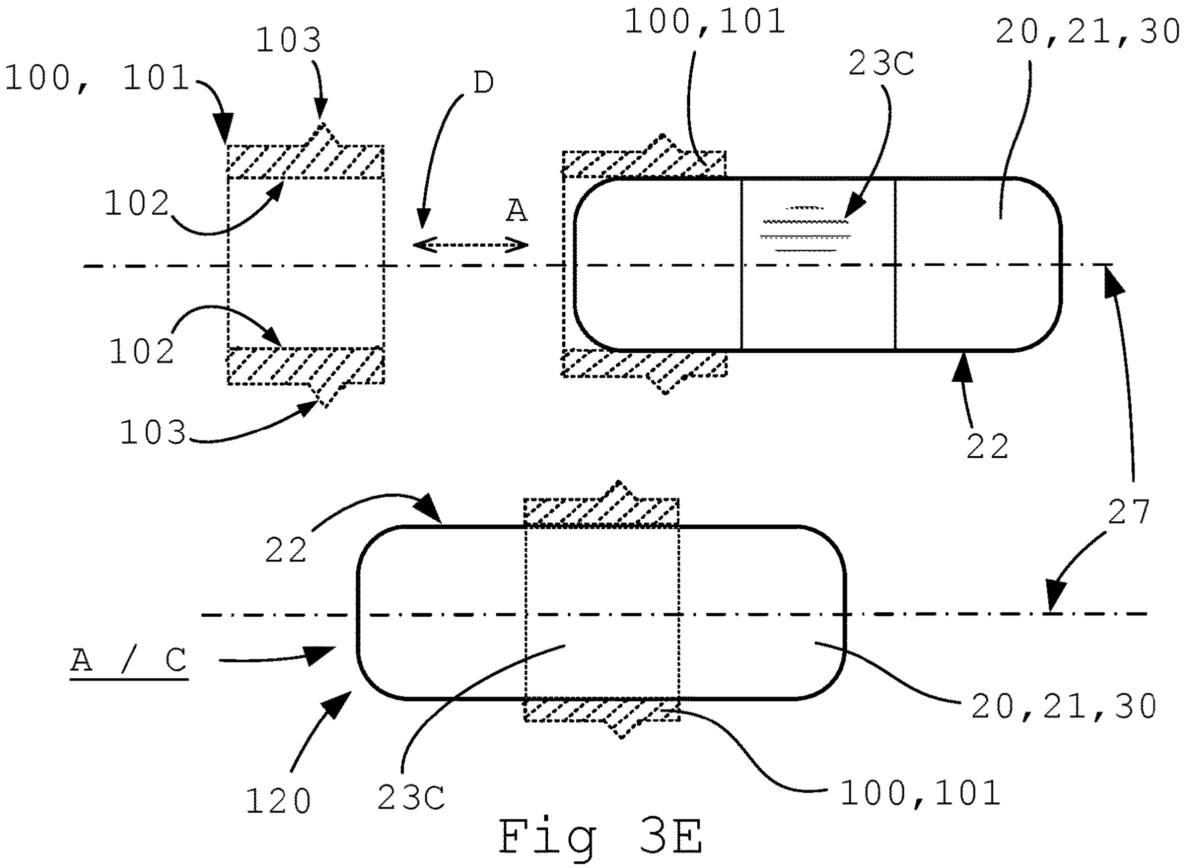

The receiver module 20 in FIGS. 1A to 3E has its receiver housing 21 and outer surface 22 shaped with rounded and smooth contours. In some embodiments, the receiver housing 21 and outer surface 22 of the receiver module 20 comprises one or more aligning structures 23 at/on/along a certain length or width of the receiver housing 21, see FIGS. 1A, 1B, 2A to 2C and 3B. In some embodiments, the one or more aligning structures 23 is configured as a substantially plane or flat section or area or as a plane or flat section or area. In some embodiments, the one or more aligning structures 23 is configured as a substantially plane or flat section or area or as a plane or flat section or area extending at least partly around the circumference surface of the receiver housing 21 of the receiver module 20. In some embodiments, the one or more aligning structures 23 extends around the circumference surface of the housing 21 of the receiver module 20 as an discontinuous structure/part (see FIGS. 1A and 3A) or as a non-broken/continuous structure/part along the whole circumference (similar to the protrusion 103 of the adapter shown in FIGS. 1A and 3A). In some embodiments, the one or more aligning structures 23 extends at least partly around the circumference surface of the housing 21 of the receiver module 20, e.g. as a groove or indent or dent 23B having a length or extension not fully corresponding to the circumference of the receiver housing. In some embodiments, the one or more aligning structures 23 extends around the whole circumference surface of the housing 21 of the receiver module 20 as a non-broken/continuous groove or indent or dent or indentation 23B. In some embodiments, the one or more aligning structures 23 extends at least partly around the circumference surface of the housing 21 of the receiver module 20, e.g. as an discontinuous protrusion or bulge or rib or edge 23A. In some embodiments, the one or more aligning structures 23 extends around the whole circumference surface of the receiver housing 21 of the receiver module 20 as a non-broken/continuous protrusion or bulge or rib (similar as the protrusion 103 on the adapter 100 shown in FIGS. 1A and 3A) or edge 23A (as shown in FIG. 3C). In some embodiments, the one or more aligning structures 23 comprises one or more pairs of protrusions 23A, wherein at least one pair of protrusions are arranged spaced apart along a direction parallel to the longitudinal center axis 27. The pair of protrusions 23A hereby forms a groove 23B in between them. In some embodiments, and as shown in FIGS. 1A, 2B, 2C and 3A, the one or more protrusions 23A may be shaped as a ramp, wherein the bottom of each ramp shaped protrusion 23A is closer to either the first end 21A or second end 21B of the receiver module 20 than the top of the respective ramp shaped protrusion 23A. In some embodiments, and as shown in FIGS. 1A, 2B, 2C and 3A, the one or more pairs of ramp shaped protrusions 23A may be arranged spaced apart and opposite each other along a direction parallel to the longitudinal center axis 27, so that a groove 23B is formed between the top of the two ramp shaped protrusions 23. In some embodiments, and as shown in FIGS. 1B, 2A and 3B, the one or more protrusions 23A may be shaped as a rounded bulge. In some embodiments, where the receiver module 20 is rectangular, the one or more pairs of protrusions 23A may be arranged on one side, on two sides, on two opposite sides, on three sides or on all four sides 24 of the receiver module 20. In some embodiments, the aligning structures 23 comprises one or more areas or bands 23C with a textured surface or a coating (see FIGS. 3D (two areas or bands 23C) and 3E (one area or band 23C)) on or between which the adapter 100 is secured in position when the adapter is assembled on/onto/over/at the aligning structures 23 of the receiver housing 21. The textured surface may be a threaded surface similar to a thread on a screw. The adapter 100 may thus be intended to be placed between and/or on one or more area or band with the textured surface or coating. The textured surface or coating may provide a higher surface friction than the surrounding outer surface 22 of the receiver housing 21 or receiver module 20. The textured surface or coating 23C may replace one or more or all of the protrusions 23A and/or groove(s) 23B shown on FIGS. 1A-3C. In all embodiments, the one or more aligning structures 23 is configured such that the adapter 100 is detachably fitted/supported/received securely on or around the receiver module 20. In some embodiments, one or more and/or differently sized and/or shaped, such as smaller and/or narrower (see FIG. 3D) and/or larger and/or wider (see FIG. 3E) textured surfaces or coatings of the areas or bands 23C could be combined with one or more protrusions 23A (see FIGS. 1A, 1B, 2A, 2B, 2C, 3A and 3B), and/or grooves 23B (see FIGS. 1B, 2A, 2B, 2C, and 3B) for improved fit, positioning, union and retention of the adapter 100 on the receiver module 20 while still making it as easy as possible to assemble and disassemble the adapter and the receiver module. When removing the adapter 100 from the receiver module 20 in a step D or moving or passing or slipping the adapter onto the receiver module in a step A (see FIG. 1A, 1B and upper views of FIGS. 3C to 3E) (or when threading the receiver module into the adapter), this could in some embodiments be done or starting at the first end 21A (shown in FIG. 1A, 1B and upper views of FIGS. 3C to 3E) and/or starting at the second end 21B. In some embodiments the assembly of the adapter 100 and the receiver module 20 could be done from one end 21A, 21B and the disassembly be done from the other end 21A, 21B of the receiver module, i.e. at different ends. In FIGS. 3C to 3E, there is not shown any electrical wire/tube 25 for simplicity reasons. It is commonly known that most receiver modules 20 are operatively connected to at least one other component, such as one or more connectors and/or control devices and/or BTE units or the like for its operation and/or control, by help of one or more electrical wires/tubes 25.

If the receiver module 20, i.e. the receiver housing 21, has a rectangular or square-shaped cross-section or body as shown on FIGS. 1A and 3A and not a rotational symmetrical shape or body, the aligning structures 23 in some embodiments do not have to be arranged on all sides 24 of the receiver module but could be arranged on only one side or two sides 24 as for the protrusions 23A. In some embodiments, one or more of the grooves 23B may be arranged on one side, on two sides, on two opposite sides, on three sides or on all four sides 24 of the receiver module 20. In some embodiments, one or more protrusions 23A could be arranged on one or more sides 24 of the receiver module 20 while one or more grooves 23B are arranged on one or more of the same sides 24 as the protrusions. In some embodiments, one or more protrusions 23A could be arranged on one or more sides 24 of the receiver module 20 while one or more grooves 23B are arranged on other sides where no protrusions are situated. In some embodiments, the arrangement of the aligning structures 23, such as one or more protrusions 23A and/or one or more grooves 23B and/or one or more areas or bands 23C with textured and/or coated surface are arranged symmetrically or are mirrored in relation to each other, such that at least two protrusions or grooves or areas or bands are located on opposite sides or diametrically opposite sides of the receiver housing 21 for providing a balance of forces when the adapter 100 is slid on or off the receiver module 20 reducing the risk of the adapter jamming or experiencing a drawer effect.

The one or more aligning structures 23 is configured to enable the adapter 100 in a first step A to be properly/correctly positioned on the receiver module 20 when detachably mounted on the outer surface 22 of the receiver module 20 and thereby provide a receiver module and adapter unit 120 (see FIGS. 3A to 3E). Properly or correctly positioned means that the adapter 100 is moved into a location or position on the outer surface 22 of the receiver module 20, i.e. a position defined by the one or more aligning structures 23, that is determined to enable the receiver module and adapter unit 120 to be introduced into the earmold 10 and then to be securely held and positioned therein without any need of post-adjustments or other fixating arrangements than just the adapter in combination with the receiver module. Hence, the adapter 100 works as a detachable belly band or waist band on the receiver module 20 that provides a less labor demanding assembly of an earpiece 2, due to a more simple assembly process, and increase the probability of a correct assembly of the earpiece parts, i.e. the receiver module 20 and the earmold 10, and/or compensates for variable tolerances of the inner cavity 11 of the earmold 10 and/or the outer surface of the receiver module 20 after manufacture that otherwise would mean that without the adapter, the receiver module 20 may risk not being securely held inside the inner cavity 11 of the earmold 10 or be too difficult or hard to introduce into the inner cavity 11, in particular if the earmold 10 and/or the housing 21 of the receiver module 20 are manufactured by 3D-printing. A step D of disassembling the adapter 100 from the receiver module 20 is thereby also provided (see double arrow of FIGS. 1A, 1B and 3C to 3E visualizing these two steps, i.e. the assembly step A, the first step, and the disassembly step D, the fourth step, of the adapter. The one or more aligning structures 23 is in a second step B, i.e. when detachably assembling the—after the first step A—receiver module and adapter unit 120 with the earmold 10, configured to keep the adapter 100 properly/correctly positioned on the receiver module 20 when the receiver module and adapter unit 120 is introduced into the inner cavity 11 of the earmold 10 in the second step B.

The through channel 13 at the first end 10A of the earmold 10 comprises a first or outer opening (FIG. 1A shows the first opening, i.e. the line from numeral 13 ends at this first or outer opening) that is open to the surrounding at the first end 10A to be able to guide sound via the through channel 13 into or out of the ear canal and into or out of the inner cavity 11 via a second or inner opening that is open to the inner cavity 11 of the earmold 10 (FIGS. 1B, 2A and 3B show the first/outer opening to the left and the second/inner opening to the right and FIGS. 2B and 2C show the first/outer opening to the right and the second/inner opening to the left).

The receiver module 20 is shown in one embodiment in FIGS. 1A, 2B, 2C, and 3A and shown in another embodiment in FIGS. 1B, 2A and 3B. In some embodiments, the receiver module 20 in FIGS. 1B, 2A, and 3B has its first end 21A shaped as a rounded and/or dome-shaped surface instead of a cylindrical hollow tube as the embodiment of FIGS. 1A, 2B, 2C, and 3A. In some embodiments, the first end 21A of the receiver module 20 could be partly shaped as in FIGS. 1A, 2B, 2C, and 3A and partly shaped as in 1B, 2A, and 3B.

An internal surface 102 of the adapter 100 is detachably assembled or fitted or held to or over or against the outer surface 22 of the receiver housing 21.

The adapter 100 is configured to be detachably attached or mounted on the receiver module 20 by being pushed and/or slid or threaded over the outer surface 22 of the receiver module. The adapter 100 may be pushed and/or slid or threaded on/over the outer surface 22 of the receiver module 20 in a direction parallel with the longitudinal center axis 27. This detachable assembly of the adapter 100 over the receiver module 20 is illustrated by a double-arrow A and D in FIGS. 1A, 1B and 3C-3E. After the detachable assembly of the adapter 100 onto the receiver module 20 (as shown in FIGS. 3A to 3E), the receiver module 20 and the adapter 100 form the receiver module and adapter unit 120 that then, in turn, is configured to be detachably assembled to the earmold 10. This subsequent detachable assembly of the receiver module and adapter unit 120 to the earmold 10 is illustrated by arrow B in FIGS. 1A, 1B and 3B. The receiver module and adapter unit 120 may be pushed and/or slid into the inner cavity 11 of the earmold 10 in a direction parallel with the longitudinal center axis 27. After that, a complete earpiece 2 is provided as shown in FIGS. 2A to 2C. In a complete assembly of the earpiece 2, the earmold 10, the receiver module 20 and the adapter 100 may have or share the same longitudinal center axis 27, wherein the longitudinal center axis 27 extends between the first end 10A and the second end 10B of the earmold 10 of the earpiece 2.

The inner cavity 11 of the earmold 10 and its inner surface 12 are configured to removably/detachably receive the adapter 100 and the receiver module 20 as one part when the adapter and the receiver module are detachably assembled as one unit 120.

When disassembling the earpiece 2, the receiver module and adapter unit 120 is detached or removed from the earmold 10 (in FIGS. 3A to 3E, the receiver module and adapter unit 120 is shown before assembly to the earmold 10 or after removal therefrom).

The adapter 100 comprises an external surface 101 and the internal surface 102. The external and internal surfaces 101, 102 enable the detachable introduction, mating and/or attachment of the assembled receiver module and adapter unit 120 with the inner cavity 11 of the earmold 10. Hence, the adapter 100 is configured to form a securing/holding and/or sealing part between the receiver module 20 and the earmold 10 when the receiver module and adapter unit 120 is detachably introduced into the earmold.

The outer surface 22 of the receiver housing 21 and the internal and external surfaces 101, 102 of the adapter 100, when the receiver module 20 and the adapter 100 are one unit 120, and the inner surface 12 of the inner cavity 11 of the earmold 10 are physically configured such that a separation/disassemble of the earmold 10 from the receiver module and adapter unit 120 requires less force than a separation/disassemble of the receiver module 20 and the adapter 100 from each other. This is accomplished in that the—when the receiver module 20 with the adapter 100 as the receiver module and adapter unit 120 is detachably assembled into the earmold 10—the friction between the outer surface 22 of the receiver housing 21, i.e. at the one or more aligning structures 23, and the internal surface 102 of the adapter 100 is higher than the friction between the inner surface 12 of the inner cavity 11 of the earmold 10 and the external surface 101 of the adapter 100.

Hence, when the receiver module and adapter unit 120 is detachably assembled into the earmold 10, the force required to pull or slide the adapter past/over/from the one or more aligning structures 23 on the outer surface 22 of the receiver housing 21 is higher than the force required to overcome the friction between the inner surface 12 of the inner cavity 11 of the earmold 10 and the external surface 101 of the adapter 100.

In some embodiments, the one or more aligning structures 23 of the outer surface 22 of the receiver housing 21 is/are two or more protrusions 23A between which the adapter 100 is secured in position when the adapter is assembled on/onto the receiver housing. In some embodiments, as shown in FIGS. 1A, 1B, 2A to 2C, and 3A to 3E, the one or more aligning structures 23 for the adapter 100 on the outer surface 22 of the receiver housing 21 is a combination of one or more areas or bands 23C with a textured surface or coating and/or two or more protrusions 23A between which the adapter 100 is secured in position when the adapter is assembled on/onto/over/at the aligning structure 23 of the receiver housing 21 and/or one or more grooves 23B in which the adapter 100 is secured in position when the adapter is assembled on/onto/over/at the aligning structure 23 of the receiver housing 21.

The assembly of the receiver module and adapter unit 120, i.e. detachably mounting the adapter 100 on the outer surface 22 of the receiver module 20, and/or the assembly of the complete earpiece, i.e. detachably mounting the receiver module and adapter unit 120 into the earmold 10, may preferably be configured to be as easy as possible for the operator or user doing the assembly, i.e. configured to be done with as little force and/or effort as possible.

In some embodiments, the outer surface 22 of the receiver housing 21, i.e. the one or more aligning structures 23, and the internal surface 102 of the adapter 100 are physically configured such that the force required to separate, i.e. disassemble, the adapter 100 and the receiver housing 21 from each other is above 3 N or between about 3 N to 8 N or between 3 N to 8 N or between about 3 N to 5 N or between 3 N to 5 N.

In some embodiments, when the receiver module and adapter unit 120 is detachably assembled into the earmold 10, the external surface 101 of the adapter 100 and the inner surface 12 of the inner cavity 11 of the earmold 10 are physically configured such that the force required to separate, i.e. disassemble, the receiver module and adapter unit 120 from the earmold 10 is above/about 3 N or between about 3 N to 12 N or between 3 N to 12 N.

In some embodiments, when the receiver module and adapter unit 120 is detachably assembled into the earmold 10, the outer surface 22 of the receiver housing 21, i.e. the aligning structure 23, and the internal surface 102 of the adapter 100 are physically configured such that the force required to separate, i.e. disassemble, the adapter 100 and the receiver housing 21 from each other is at least 1 N more than the force required to separate, i.e. disassemble, the receiver module and adapter unit 120, i.e. the receiver housing 21 detachably connected with the adapter 100, from the earmold 10.

In some embodiments, the force required to separate/disassemble the adapter 100 from the receiver module 20 is increased when the receiver module and adapter unit 120 is detachably assembled into the earmold 10, compared to the force required to separate/disassemble the adapter 100 from the receiver module 20 when not being detachably assembled into the earmold 10. This, as the internal surface 101 of the adapter 100 is pressed towards the outer surface 22 of the receiver housing 21 by the earmold 10 when the receiver module and adapter unit 120 is detachably assembled into the earmold 10. This provide an improved and/or tight fitting providing an improved securing/holding of the adapter 100 on the receiver module 20 and/or sealing to hinder leakage of sound and/or dirt between the receiver module 20 and the earmold 10.

In some embodiments, the external surface 101 of the adapter 100 comprises one or more protrusions 103 configured to form a securing/holding and/or sealing part to hinder leakage of sound and/or dirt between the receiver module 20 and the earmold 10 when the receiver module and adapter unit 120 is detachably assembled into the earmold 10 (see FIGS. 1A to 3B). In some embodiments, the one or more protrusions 103 has a hardness or softness such that when the receiver module and adapter unit 120 is detachably introduced into or when received and placed correctly inside the earmold 10 the one or more protrusions 103 is at least partly flattened providing a larger contact or engagement surface/area between the inner surface 12 of the inner cavity 11 of the earmold 10 and the external surface 101 on the adapter 100, this being shown in FIG. 2B. This creates a greater force and/or friction to be overcome both when introducing the receiver module and adapter unit 120 into the earmold 10 and correctly positioning the receiver module and adapter unit 120 therein in the second step B and when removing the receiver module and adapter unit 120 from the earmold 10 in another or third step C of disassembly.

In some embodiments, at least one of the one or more protrusions 103 extends along the whole circumference of the external surface 101 of the adapter 100. Hereby is leakage of sound and/or dirt between the outer surface 22 of the receiver module 20 and the inner surface 12 of the earmold 10 hindered. In some embodiments, the one or more protrusions 103 are triangular shaped (as shown in FIGS. 1A-3E) and/or ramp shaped and/or semicircular shaped and/or bulge shaped.

In some embodiments, the inner surface 12 of the inner cavity 11 of the earmold 10 comprises one or more grooves or indents 14 configured to receive the one or more protrusions 103 on the external surface 101 of the adapter 100, this is shown in FIG. 2C. This provides an increased probability of a correct assembly of the receiver module and adapter unit 120 into the earmold 10, as the user or operator doing the assembly receives a haptic feedback indicating that correct placement/positioning has been achieved. This further provides a greater force to be overcome when removing the receiver module and adapter unit 120 out of the earmold 10 in the third step C as then one or more of the protrusions 103 must be forced out of physical engagement in/with at least one or more of the grooves or indents 14 before the receiver module and adapter unit 120 can be fully removed from/taken out of the inner cavity 11 of the earmold.

Correct placement/positioning of the receiver module and adapter unit 120 in the earmold 10 may in one embodiment be provided when the receiver module and adapter unit 120 is pushed as far as possible into the earmold 10 so that the sound channel 26 of the receiver module 20 and the inner channel 13 of the earmold 10 is placed adjacent each other and/or abuts each other. The user or operator doing the assembly receives an indication that correct placement/positioning has been achieved, when the receiver module and adapter unit 120 cannot be pushed further into the earmold 10. The sound channel 26 of the receiver module 20 and the inner channel 13 of the earmold 10 may in an assembled earpiece 2 have the same longitudinal center axis, such as the longitudinal center axis 27.

In some embodiments, one or more or all of the protrusions 103 of the adapter 100 is/are configured to be adaptable, which means that the one or more protrusion(s) 103 is/are configured to be compressible and/or shapeable and/or shape-changeable and/or formable and/or deformable and/or malleable. This means that the one or more protrusion(s) 103 is/are configured to be compressed and/or change in shape and/or be formed and/or be deformed and/or be reshaped when the receiver module and adapter unit 120 is introduced into the inner cavity 11 of the earmold 10 and when removed out of the inner cavity, the protrusion(s) 103 change back to the shape/state it had before the introduction.

In some embodiments, the inner surface 12 of the inner cavity 11 of the earmold 10 comprises one or more grooves or indents 14 configured to receive the one or more protrusions 103 on the external surface 101 of the adapter 100 as described above, wherein the one or more protrusions 103 are adaptable as described above.

An aspect of this disclosure concerns a method of detachable assembly of the earpiece 2 of a hearing device 1 in that the earpiece 2 is configured for insertion into at least a part of an ear canal of a user's ear, and the receiver module 20 is configured to be detachably introduced into the inner cavity 11 of the earmold 10 by firstly detachably mating/attaching the receiver housing 21 with the adapter 100 in the first step A by detachably assembling/fitting/mounting the adapter over the outer surface 22 of the receiver housing 21 (in some embodiments also over and in alignment with the one or more aligning structures 23, such as over the one or more protrusions 23A and/or into the grooves 23B and/or on/over the one or more areas or bands 23C with the textured surface or coating) and then in the second step B detachably introducing the receiver module 20 with the adapter 100 as one receiver module and adapter unit 120 into the inner cavity 11 of the earmold 10.

In some embodiments, the method comprises the step C of disassembling the receiver module and adapter unit 120 from the earmold 10. The step C is in some embodiments a third step of the method of detachable assembly. In some embodiments, the method comprises the other step D of disassembling the adapter 100 from the receiver module 20 thereby dividing or "splitting up" the unitary part or unit 120 into its two main components, i.e. the adapter and receiver module separately. The step D is in some embodiments a fourth step of the method of detachable assembly.

In some embodiments, the receiver module and adapter unit 120 provides a distinct and easy fitting of the receiver module and adapter unit 120 into the earmold 10 by means of a snap or click in-function that gives the user or operator a haptic feedback when the receiver module and adapter unit 120 is pushed far enough into the inner cavity 11 of the earmold 10. This provides an intuitive and recognizable response that the assembly of the receiver module and adapter unit 120 into the earmold 10 is done correctly and also reduces the risk of faulty assembly, in particular as the production tolerances of the parts may be variable and might lead to size and/or shape differences of the manufactured parts.

The adapter 100 is in some embodiments only for one-time use, i.e. a disposable item, to eliminate having to store the adapter after disassembly from the receiver module 20. The adapter 100 is in some embodiments made for reuse, or even made of a recyclable material to eliminate having to dispose of it and to be able to recycle it after disassembly from the receiver module 20.

In some embodiments, the adapter 100 in itself also compensates for differently and varying sizes/shapes and tolerances of the receiver housing 21 when mounted thereon also allowing for a greater range of flaws in the manufacture of the receiver module 20. This provides a sufficiently strong and secure retention of the receiver module and adapter unit 120 in the earmold 10. This provides an improved seal and tightness and fit of the receiver module and adapter unit 120 in the earmold 10 as the first end 21A of the receiver housing 21 has its sound channel 26 in more secure and precise abutment and alignment with the inner channel 13 of the earmold.

FIG. 4 schematically illustrates an example of a hearing device 1, such as a hearing aid, with a receiver module 20 and adapter 100 and an earmold 10. The hearing device 1 comprises the receiver 30 and a microphone 31 for receiving an input signal and converting it into an audio signal. The audio signal is provided to a processing unit 32 for processing the audio signal and providing a processed output signal for compensating a hearing loss of a user of the hearing device 1. The receiver 30 is operatively connected, e.g. via the electrical wire/tube 25, to an output of the processing unit 32 for converting the processed output signal into an output sound signal, e.g. a signal modified to compensate for a user's hearing impairment. Typically, the receiver 30 comprises a transducer, and the receiver 30 is often referred to as a speaker. The processing unit 32 comprises elements such as amplifiers, compressors, noise reduction systems, etc. to enable operating the hearing device 1. The hearing device 1 may comprise a wireless communication unit 33 for wireless data communication interconnected with an antenna structure 34 to emit and receive an electro-magnetic field. The wireless communication unit 33, e.g. a radio or a transceiver, operatively connects to the processing unit 32 and the antenna structure 34, for communicating with another electronic device, an external device, or with another hearing device, such as another hearing aid located in/on/at another ear of the user, typically in a binaural hearing system. The hearing device 1 may comprise two or more antenna structures 34.

The earpiece 2 may be part of an in-the-ear (ITE) unit or of the hearing device 1. The receiver 30 in the earpiece 2 is operatively connected to a Behind-the-Ear (BTE) unit of the hearing device 1 via the electrical wire/tube 25.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

Item 1: An earpiece (2) for a hearing device (1), wherein the earpiece is configured for insertion into at least a part of an ear canal of a user's ear and comprises an earmold (10) and a receiver module (20), wherein the receiver module is configured to be detachably introduced into an inner cavity (11) of the earmold (10) and comprises a receiver housing (21) with an outer surface (22) and a receiver (30), which receiver housing (21) is configured for detachable mating and/or attachment with an adapter (100) having an external and an internal surface (101, 102) to enable the detachable introduction, mating and/or attachment of the receiver module (20) and the adapter (100) with the inner cavity (11) of the earmold (10), characterized in that when the receiver module (20) with the adapter (100) is detachably assembled into the earmold (10) the outer surface (22) of the receiver housing (21) and the internal and external surfaces (101, 102) of the adapter (100) and the inner surface (12) of the inner cavity (11) of the earmold (10) are physically configured such that a separation of the earmold (10) from the adapter (100) and the receiver module (20) requires less force than a separation of the receiver module (20) and the adapter (100) from each other.

Item 2: The earpiece (2) according to item 1, wherein, when the receiver module (20) with the adapter (100) is detachably assembled into the earmold (10), the friction between the outer surface (22) of the receiver housing (21) and the internal surface (102) of the adapter is higher than the friction between the inner surface (12) of the inner cavity (11) of the earmold and the external surface (101) of the adapter.

Item 3: The earpiece (2) according to item 1 or 2, wherein the outer surface (22) of the receiver housing (21) comprises one or more aligning structures (23) enabling the adapter (100) to be properly positioned thereon.

Item 4: The earpiece (2) according to item 3, wherein, when the receiver module (20) with the adapter (100) is detachably assembled into the earmold (10), the force required to pull the adapter past/over the one or more aligning structures (23) on the outer surface (22) of the receiver housing (21) is higher than the force required to overcome the friction between the inner surface (12) of the inner cavity (11) of the earmold and the external surface (101) of the adapter.

Item 5: The earpiece (2) according to any preceding item, wherein the adapter (100) is configured to form a securing and/or sealing part between the receiver module (20) and the earmold (10) when the receiver module with the adapter is detachably assembled into the earmold.

Item 6: The earpiece (2) according to item 3 or 4 or item 5 when dependent on item 3, wherein the one or more aligning structures (23) of the outer surface (22) of the receiver housing (21) is/are configured to secure the adapter (100) in position when the adapter is assembled on the receiver housing (21) and/or receiver module (20).

Item 7: The earpiece (2) according to item 3 or 4 or 6 or item 5 when dependent on item 3, wherein the one or more aligning structures (23) of the outer surface (22) of the receiver housing (21) is two or more protrusions (23A) between which the adapter (100) is secured in position when the adapter is assembled on the receiver housing (21) and/or receiver module (20).

Item 8: The earpiece (2) according to item 3 or 4 or 6 or 7 or item 5 when dependent on item 3, wherein the one or more aligning structures (23) of the outer surface (22) of the receiver housing (21) is one or more grooves (23B) in which the adapter (100) is introduced and secured in position when the adapter is assembled on/to the receiver housing (21) and/or receiver module (20).

Item 9: The earpiece (2) according to item 3 or 4 or 6 or 7 or item 5 when dependent on item 3, wherein the one or more aligning structures (23) of the outer surface (22) of the receiver housing (21) is a band or area (23C) having a textured and/or coated surface on/over/at which the adapter (100) is introduced and secured in position when the adapter is assembled on/to/onto/over the receiver housing (21) and/or receiver module (20).

Item 10: The earpiece (2) according to any preceding item, wherein the outer surface (22) of the receiver housing (21) and the internal surface (102) of the adapter (100) are physically configured such that the force required to separate the adapter from the receiver housing (21) and/or receiver module (20) is above 3 N or between about 3 N to 8 N or between 3 N to 8 N or between about 3 N to 5 N or between 3 N to 5 N.

Item 11: The earpiece (2) according to any preceding item, wherein, when the receiver module (20) with the adapter (100) is detachably assembled into the earmold (10), the external surface (101) of the adapter (100) and the inner surface (12) of the inner cavity (11) of the earmold (10) are physically configured such that the force required to separate the adapter and the receiver housing (21) and/or receiver module (20) from the earmold (10) is above 3 N or between about 3 N to 12 N or between 3 N to 12 N.

Item 12: The earpiece (2) according to item 10 or 11, wherein, when the receiver module (20) with the adapter (100) is detachably assembled into the earmold (10), the outer surface (22) of the receiver housing (21) and the internal surface (102) of the adapter (100) are physically configured such that the force required to separate the adapter from the receiver housing (21) and/or receiver module (20) is at least 1 N more than the force required to separate the receiver module (20) with the adapter (100) as a receiver module and adapter unit (120) from the earmold (10).

Item 13: The earpiece (2) according to any preceding item, wherein the force required to separate/disassemble the adapter (100) from the receiver module (20) is increased when the receiver module and adapter unit (120) is detachably assembled into the earmold (10), compared to the force required to separate/disassemble the adapter (100) from the receiver module (20) when the receiver module and adapter unit (120) is not being detachably assembled into the earmold (10).

Item 14: The earpiece (2) according to any preceding item, wherein the external surface (101) of the adapter (100) comprises one or more protrusions (103) configured to form the securing and/or sealing part between the receiver module (20) and the earmold (10) when the receiver module with the adapter is detachably assembled into the earmold.

Item 15: The earpiece (2) according to item 14, wherein the inner surface (12) of the inner cavity (11) of the earmold (10) comprises one or more groove(s) (14) configured to receive the one or more protrusions (103) on the external surface (101) of the adapter (100).

Item 16: The earpiece (2) according to item 14 or 15, wherein one or more or all of the protrusions (103) of the adapter (100) is/are configured to be adaptable.

Item 17: The earpiece (2) according to any preceding item, wherein the earmold (10) is a custom mold.

Item 18: A method of detachable assembly of an earpiece (2) of a hearing device (1), the earpiece being configured for insertion into at least a part of an ear canal of a user's ear and comprises an earmold (10) and a receiver module (20), wherein the receiver module is configured to be detachably introduced into an inner cavity (11) of the earmold (10) and comprises a receiver housing (21) with an outer surface (22) and a receiver (30), characterized by detachably mating the receiver housing (21) with an adapter (100) in a first step (A) by detachably assembling the adapter over the outer surface (22) of the receiver housing (21) and in a second step (B) detachably introducing the receiver module (20) with the adapter (100) as a receiver module and adapter unit (120) into the inner cavity (11) of the earmold (10).

Item 19: The method of detachable assembly of an earpiece (2) according to item 18, further in the first step (A) properly positioning the adapter (100) on the receiver module (20).

Item 20: The method of detachable assembly of an earpiece (2) according to item 18 or 19, further in the second step (B) properly positioning the receiver module (20) with the adapter (100) as the receiver module and adapter unit (120) inside the inner cavity (11) of the earmold (10).

Item 21: The method of detachable assembly of an earpiece (2) according to any of items 18 to 20, further comprising a third step (C) of disassembling the receiver module (20) with the adapter (100) from the earmold (10).

Item 22: The method of detachable assembly of an earpiece (2) according to any of items 18 to 21, further comprising a fourth step (D) of disassembling the receiver module (20) and the adapter (100) from each other.

Item 23: The method of detachable assembly of an earpiece (2) according to items 18 to 22, wherein the earpiece is an earpiece (2) according to any of items 1 to 17.

LIST OF REFERENCES

1 Hearing device.
2 Earpiece (after assembly step B).
10 Earmold (hard or soft or a combination of hard and soft materials).
10A First end of earmold 10.
10B Second end of earmold 10.
11 Inner cavity of the earmold 10 for detachably receiving a receiver module 20.
12 Inner surface of the inner cavity 11 of the earmold 10.
13 Inner channel of the earmold 10 for transmitting/guiding sound.
14 Inner groove(s)/indent(s) configured/adapted to receive one or more of the protrusions
103 on the external surface 101 of the adapter 100.
20 Receiver module.
21 Receiver housing of receiver module 20.
21A One/First end of receiver module 20 and receiver housing 21.
21B Another/Second end of receiver module 20 and receiver housing 21.
21C Front part of receiver housing 21.
21D Rear part of receiver housing 21.
22 Outer/External surface of receiver housing 21.
23 Aligning structures of outer/external surface 22 of receiver housing being configured for detachably or fixedly receiving the adapter 100.
23A Protrusion or bulge or rib or edge on outer/external surface 22 of receiver housing 21.
23B Groove or indent or dent in/on outer/external surface 22 of receiver housing 21.
23C Areas or bands on outer/external surface 22 of receiver housing 21 having a coating and/or a textured surface.
24 Side of the receiver module 20 and receiver housing 21.
25 Electrical wire/tube.
26 Sound channel of the receiver module 20 for transmitting sound.
27 Longitudinal center axis.
30 Receiver/speaker/miniature speaker.
31 Microphone.
32 Processing unit.
33 Wireless communication unit.
34 Antenna structure.
100 Adapter or sleeve configured to work as a bellyband being detachably or fixedly attached to the outer/external surface 22 of the receiver module 20.
101 External/Outer surface of adapter/sleeve 100.
102 Internal/Inner surface of adapter/sleeve 100.
103 Protrusion/Flange on the outer/external surface of the adapter/sleeve.
120 Receiver module and adapter unit.
A One/First step of detachable assembly of the receiver module and adapter unit 120 and/or earpiece 2.
B Another/Second step of the detachable assembly of the earpiece 2.
C Yet another/Third step of the detachable assembly being a step of disassembling the earpiece 2.
D Yet another/Fourth step of the detachable assembly being another step of disassembling the receiver module and adapter unit 120 and/or earpiece 2.

The invention claimed is:

1. An earpiece for a hearing device, wherein the earpiece is configured for insertion into at least a part of an ear canal of a user's ear, the earpiece comprising: an earmold comprising an inner cavity; a receiver module comprising a receiver and a receiver housing, the receiver housing having an outer surface, wherein the cavity of the earmold is configured to accommodate the receiver module; an elongated member extending from the receiver module; the elongated member comprising a cable; and an adapter having an external surface and an internal surface; wherein the receiver module is configured to detachably couple with the adapter, and wherein the adapter is configured to detachably couple with the earmold; wherein when the receiver module, the adapter, and the earmold are assembled together, a separation of the earmold from the adapter requires less force than a separation of the receiver module from the adapter; and wherein the receiver module is removeable from the adapter while the elongated member is extending from the receiver module.

2. The earpiece according to claim 1, wherein when the receiver module, the adapter, and the earmold are assembled together, a first friction between the outer surface of the receiver housing and the internal surface of the adapter is higher than a second friction between an inner surface of the earmold and the external surface of the adapter.

3. The earpiece according to claim 1, wherein the outer surface of the receiver housing comprises one or more aligning structures providing an indication that the adapter is properly positioned with respect to the receiver module.

4. The earpiece according to claim 3, wherein the one or more aligning structures of the outer surface of the receiver housing comprise one or more grooves, and wherein at least a part of the adapter is configured for placement in one of the one or more grooves.

5. The earpiece according to claim 3, wherein a force required to move the adapter past/over the one or more aligning structures on the outer surface of the receiver housing is higher than a force required to overcome a friction between an inner surface of the earmold and the external surface of the adapter.

6. The earpiece according to claim 1, wherein the outer surface of the receiver housing comprises one or more aligning structures configured to align the adapter with the receiver housing.

7. The earpiece according to claim 1, wherein the adapter is configured to form a securing and/or sealing part between the receiver module and the earmold.

8. The earpiece according to claim 1, wherein the external surface of the adapter comprises one or more protrusions.

9. The earpiece according to claim 8, wherein the one or more protrusions at the external surface of the adapter are configured to form a securing and/or sealing part between the receiver module and the earmold.

10. The earpiece according to claim 8, wherein an inner surface of the earmold comprises one or more groove(s) configured to receive the one or more protrusions at the external surface of the adapter.

11. The earpiece according to claim 8, wherein at least one of the one or more protrusions of the adapter is configured to be adaptable.

12. The earpiece according to claim 1, wherein the outer surface of the receiver housing and the internal surface of the adapter comprise respective physical features that enable the receiver module to detachably couple with the adapter.

13. The earpiece according to claim 1, wherein the external surface of the adapter and an inner surface of the earmold comprise respective physical features that enable the adapter to detachably couple with the earmold.

14. The earpiece according to claim 1, wherein the receiver module is removeable from the adapter by pulling the elongated member in a direction that is away from the adapter.

15. An earpiece for a hearing device, wherein the earpiece is configured for insertion into at least a part of an ear canal of a user's ear, the earpiece comprising:

an earmold comprising an inner cavity;

a receiver module comprising a receiver and a receiver housing, the receiver housing having an outer surface, wherein the cavity of the earmold is configured to accommodate the receiver module; and an adapter having an external surface and an internal surface;

wherein the receiver module is configured to detachably couple with the adapter, and wherein the adapter is configured to detachably couple with the earmold;

wherein when the receiver module, the adapter, and the earmold are assembled together, a separation of the earmold from the adapter requires less force than a separation of the receiver module from the adapter;

wherein the outer surface of the receiver housing comprises one or more aligning structures providing an indication that the adapter is properly positioned with respect to the receiver module; and wherein the one or more aligning structures of the outer surface of the receiver housing comprise two or more protrusions, and wherein at least a part of the adapter is configured for placement between two of the two or more protrusion.

16. An earpiece for a hearing device, wherein the earpiece is configured for insertion into at least a part of an ear canal of a user's ear, the earpiece comprising:

an earmold comprising an inner cavity;

a receiver module comprising a receiver and a receiver housing, the receiver housing having an outer surface, wherein the cavity of the earmold is configured to accommodate the receiver module; and an adapter having an external surface and an internal surface;

wherein the receiver module is configured to detachably couple with the adapter, and wherein the adapter is configured to detachably couple with the earmold;

wherein when the receiver module, the adapter, and the earmold are assembled together, a separation of the earmold from the adapter requires less force than a separation of the receiver module from the adapter; and wherein when the receiver module is detachably coupled to the adapter, the force required to separate the adapter from the receiver module is 3 N or higher.

17. An earpiece for a hearing device, wherein the earpiece is configured for insertion into at least a part of an ear canal of a user's ear, the earpiece comprising:

an earmold comprising an inner cavity;

a receiver module comprising a receiver and a receiver housing, the receiver housing having an outer surface, wherein the cavity of the earmold is configured to accommodate the receiver module; and an adapter having an external surface and an internal surface;

wherein the receiver module is configured to detachably couple with the adapter, and wherein the adapter is configured to detachably couple with the earmold;

wherein when the receiver module, the adapter, and the earmold are assembled together, a separation of the earmold from the adapter requires less force than a separation of the receiver module from the adapter; and wherein when the receiver module is detachably coupled to the adapter, the force required to separate the adapter from the receiver module is 8 N or lower.

18. An earpiece for a hearing device, wherein the earpiece is configured for insertion into at least a part of an ear canal of a user's ear, the earpiece comprising:

an earmold comprising an inner cavity;

a receiver module comprising a receiver and a receiver housing, the receiver housing having an outer surface, wherein the cavity of the earmold is configured to accommodate the receiver module; and an adapter having an external surface and an internal surface;

wherein the receiver module is configured to detachably couple with the adapter, and wherein the adapter is configured to detachably couple with the earmold;

wherein when the receiver module, the adapter, and the earmold are assembled together a separation of the earmold from the adapter requires less force than a separation of the receiver module from the adapter; and wherein when the adapter is detachably coupled with the earmold, the force required to separate the adapter from the earmold is 3 N or higher.

19. An earpiece for a hearing device, wherein the earpiece is configured for insertion into at least a part of an ear canal of a user's ear, the earpiece comprising:

an earmold comprising an inner cavity;

a receiver module comprising a receiver and a receiver housing, the receiver housing having an outer surface, wherein the cavity of the earmold is configured to accommodate the receiver module; and an adapter having an external surface and an internal surface;

wherein the receiver module is configured to detachably couple with the adapter, and wherein the adapter is configured to detachably couple with the earmold;

wherein when the receiver module, the adapter, and the earmold are assembled together, a separation of the earmold from the adapter requires less force than a separation of the receiver module from the adapter; and wherein when the adapter is detachably coupled with the earmold, the force required to separate the adapter from the earmold is 12 N or lower.

20. A method performed by an earpiece of a hearing device, the earpiece being configured for insertion into at least a part of an ear canal of a user's ear, the earpiece comprising an earmold, a receiver module, an elongated member extending from the receiver module, and an adapter, the earmold having an inner cavity, the receiver module comprising a receiver and a receiver housing with an outer surface, the elongated member comprising a cable, the method comprising: receiving the receiver module by the adapter, wherein after the adapter receives the receiver module, the receiver module is detachably coupled with the adapter; and receiving the adapter by the inner cavity of the earmold, wherein after the inner cavity of the earmold receives the adapter, the adapter is detachably coupled with the earmold; wherein the receiver module is removeable from the adapter while the elongated member is extending from the receiver module.

21. The method according to claim 20, wherein the acts of receiving result in the receiver module, the adapter, and the earmold being assembled together; and wherein when the receiver module, the adapter, and the earmold are assembled together, a separation of the earmold from the adapter requires less force than a separation of the receiver module from the adapter.

22. The method according to claim 20, wherein the receiver module is removeable from the adapter by pulling the elongated member in a direction that is away from the adapter.

* * * * *